US012506736B2

(12) United States Patent
Lukyanov et al.

(10) Patent No.: US 12,506,736 B2
(45) Date of Patent: Dec. 23, 2025

(54) AUTHENTICATION AND IDENTITY ARCHITECTURE FOR A MANAGEMENT PLANE OF A MULTI-TENANT COMPUTING SYSTEM

(71) Applicant: Microsoft Technology Licensing, LLC, Redmond, WA (US)

(72) Inventors: Andrey Anatolyevich Lukyanov, Redmond, WA (US); Pradeep Kumar Mishra, Telangana (IN); Joel T. Hendrickson, Redmond, WA (US); Bryan Robert Jeffrey, Littleton, MA (US); Jimmy Bahuleyan, Punjab (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 390 days.

(21) Appl. No.: 18/067,072

(22) Filed: Dec. 16, 2022

(65) Prior Publication Data

US 2024/0205226 A1   Jun. 20, 2024

(51) Int. Cl.
  *H04L 9/40*    (2022.01)
(52) U.S. Cl.
  CPC ........ *H04L 63/102* (2013.01); *H04L 63/0823* (2013.01)
(58) Field of Classification Search
  CPC ................ H04L 63/102; H04L 63/0823
  See application file for complete search history.

(56) References Cited

U.S. PATENT DOCUMENTS

| 10,581,820 | B2* | 3/2020 | Keshava | H04L 9/0894 |
| 2013/0080520 | A1* | 3/2013 | Kiukkonen | H04W 12/084 |
| | | | | 709/204 |
| 2021/0112138 | A1* | 4/2021 | Eberlein | G06F 16/211 |
| 2021/0409219 | A1* | 12/2021 | Elmenshawy | H04L 9/3228 |

OTHER PUBLICATIONS

"Azure Identity Client Module for Go", Retrieved From: https://pkg.go.dev/github.com/Azure/azure-sdk-for-go/sdk/azidentity#/section-readme, Nov. 7, 2022, 24 Pages.
"Crypto Package", Retrieved From: https://pkg.go.dev/crypto#PrivateKey, Nov. 1, 2022, 8 Pages.
"Private Endpoints", Retrieved from: https://learn.microsoft.com/en~us/rest/api/virtualnetwork/private-endpoints, May 1, 2022, 1 Page.
"Private Endpoints—Create or Update". Retrieved From: https://learn.microsoft.com/en-us/rest/api/virtualnetwork/private-endpoints/create-or-update?tabs=HTTP, May 1, 2022, 65 Pages.
"Private Endpoints—Delete", Retrieved From: https://learn.microsoft.com/en~us/rest/api/virtualnetwork/private-endpoints/delete?labs=HTTP, May 1, 2022, 4 Pages.

(Continued)

*Primary Examiner* — Sm A Rahman
(74) *Attorney, Agent, or Firm* — Ray Quinney & Nebeker P.C.; Paul N. Taylor

(57) ABSTRACT

In a multi-tenant computing system, a set of subscriptions are generated, to which resources are assigned. Each subscription has a management application that is used to manage access to resources in the subscription. Credentials that are used by the management application are stored in a key vault within the subscription.

20 Claims, 10 Drawing Sheets

(56) References Cited

OTHER PUBLICATIONS

"Sign—sign", Retrieved From: https://learn.microsoft.com/en-us/rest/api/keyvault/keys/sign/sign?tabs=HTTP, May 28, 2022, 6 Pages.
"TokenCredential Class", Retrieved From: https://learn.microsoft.com/en~us/dotnet/api/azure.core,tokencredential?View=azure-dotnet, Retrieved on: May 28, 2022,.
Baldwin, et al., "Configure Azure Key Vault firewalls and virtual networks", Retrieved From: https://learn.microsoft.com/en-us/azure/key-vault/general/network-security#key-vault-firewall-enabled-ipv4-addresses-and-ranges--static-ips, Oct. 29, 2022, 4 Pages.
Baldwin, et al., "Integrate Key Vault with Azure Private Link", Retrieved From: https://learn.microsoft.com/en-us/azure/key-vault/general/private-link-service?tabs=portal, Sep. 23, 2022, 9 Pages.
Baldwin, et al., "Virtual network service endpoints for Azure Key Vault", Retrieved From: https://learn.microsoft.com/en-us/azure/key-vault/general/overview-vnet-service-endpoints, Nov. 21, 2022, 4 Pages.
Luo, Ray, "SubjectName/Issuer (SNI) authentication #60", Retrieved From: https://github.com/AzureAD/microsoft-authentication-library-for-python/issues/60, Jun. 14, 2019, 6 Pages.
Prieur, et al., "Confidential client assertions", Retrieved From: https://learn.microsoft.com/en-us/azure/active-directory/develop/msal-net-client-assertions, Jun. 16, 2022.
Vimrang, et al., "Azure AD certificate-based authentication technical deep dive", Retrieved From: https://learn.microsoft.com/en-us/azure/active-directory/authentication/concept-certificate-based-authentication-technical-deep-dive, Nov. 11, 2022, 24 Pages.

\* cited by examiner

AUTHENTICATION AND IDENTITY ARCHITECTURE FOR A MANAGEMENT PLANE OF A MULTI-TENANT COMPUTING SYSTEM

BACKGROUND

Computing systems are currently in wide use. Some computing systems include hosted systems that host computing system resources in a remote server environment, such as in a cloud computing system. Such hosted computing system resources can include such things as data storage resources, computer processing resources, applications, computing system management resources, among others.

Such computing systems may also be multi-tenant computing systems which host resources for multiple different tenants. A tenant may be a company or another type of organization.

Such computer systems can be described as including multiple different layers or planes. A first layer or plane may be referred to as the data layer or data plane (hereinafter data plane). The data plane is the part of the system in which customers (e.g., tenants) access customer data in the resources to perform operations on that data. A second plane may be referred to as a management plane or a control plane (hereinafter management plane). The management plane is used by users, such as system administrators, etc., in order to perform management operations, such as to control access to customer data. Thus, the management plane can be used to configure access to different resources, set up groups, etc.

The discussion above is merely provided for general background information and is not intended to be used as an aid in determining the scope of the claimed subject matter.

SUMMARY

In a multi-tenant computing system, a set of subscriptions are generated, to which resources are assigned. Each subscription has a management application that is used to manage access to resources in the subscription. Credentials that are used by the management application are stored in a key vault within the subscription.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As discussed above, a management plane may be provided in a multi-tenant computing system in order to allow administrators, engineers, etc., to configure components and manage access to resources in the multi-tenant computing system. In such systems, it can be difficult to maintain security. For instance, if a portion of the management plane is compromised, this can result in a surreptitious actor obtaining access to customer data. Security architectures are thus deployed in order to reduce the likelihood of surreptitious activity.

The present discussion thus proceeds with respect to a system that uses management identities to manage resources. For purposes of the present discussion, an identity is an item which can be authenticated by an authentication system, such as an application or server that is authenticated using a private key or certificate. Resources are segmented into different subscriptions to achieve a segmented breach boundary. Further, the management identities only have access to a subset of the subscriptions in the system in order to further limit the breach boundary in the case that the management identity is compromised. The authentication credentials used by the management identities are stored as non-exportable credentials in a key vault within the corresponding subscription. The management identity is issued short lived, least privileged access credentials for performing management operations, and management operations that are triggered by actors residing outside of the compliance boundary of the computing system are authorized using manual authorization systems. External management identities only have access to subscriptions through a private link between the virtual networks of the external management identity and the subscription.

This architecture enhances security in several ways. If a management identity is compromised, it only has access to one or a small subset of subscriptions. If access to a key vault is compromised, only the subscription that contains the key vault is compromised. If any external management entity is compromised, its access to a subscription can easily be eliminated by deleting its private link to the subscription.

Figure 1:
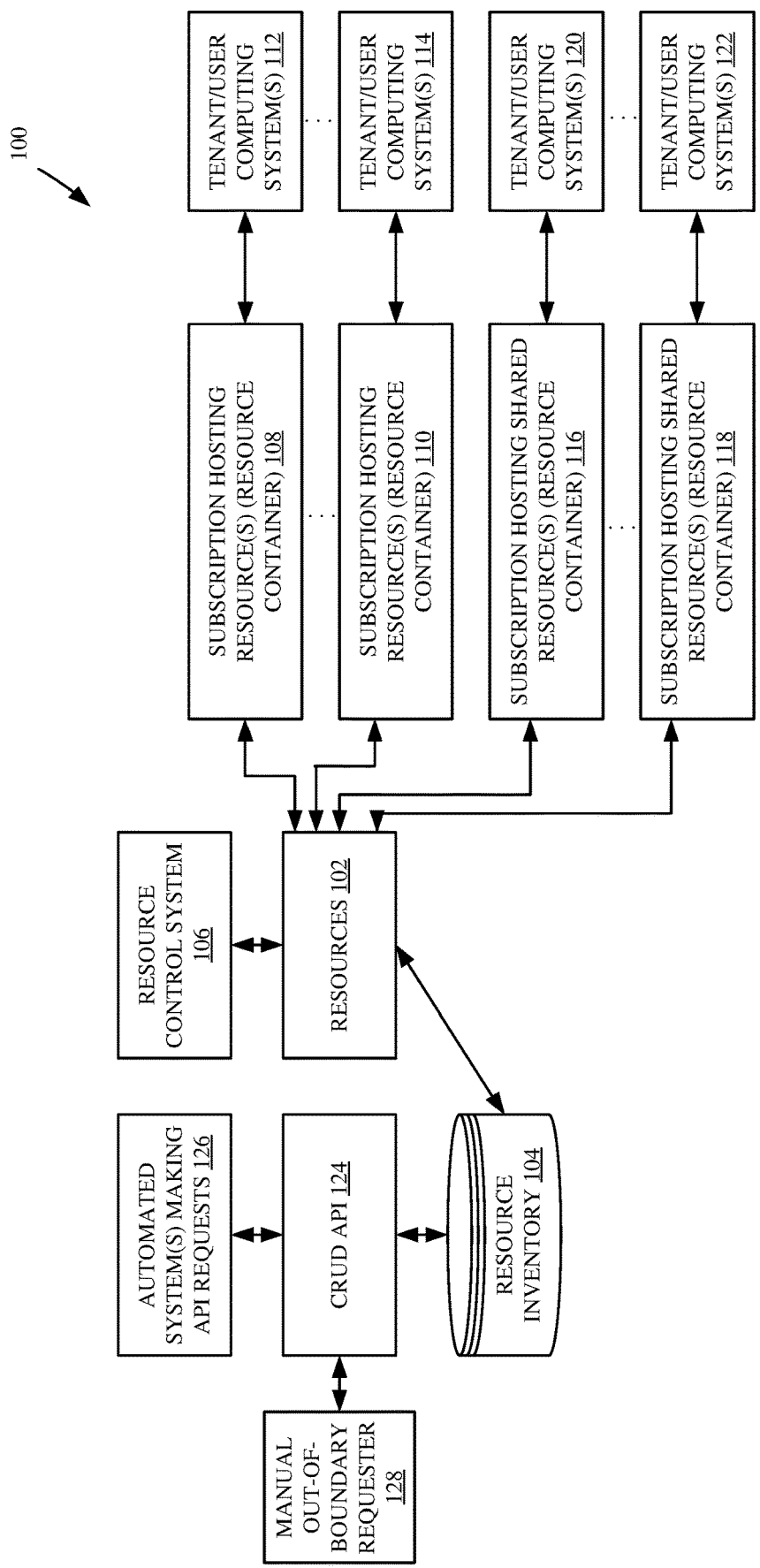
FIG. 1 is a block diagram of one example of a computing system architecture.

FIG. 1 is a block diagram showing one example of a multi-tenant computing system architecture 100. In the example shown in FIG. 1, architecture 100 includes computing system resources 102, resource inventory data store 104, resource control system 106, a set of resource containers (subscriptions) that host resources 102 for users. For example, FIG. 1 shows that architecture 100 can include subscriptions 108-110 that host resources for tenant/user computing systems 112-114. Architecture 100 also includes subscriptions 116-118 that host shared resources for one or more tenant/user computing systems 120-122. The subscriptions 108-110, 116, and 118 thus form partitions or segments for partitioning or segmenting the resources 102. The shared resources hosted by subscriptions 116 and 118 may include shared platform resources, such as system key vaults, managed identities, monitoring resources, etc.

In the example shown in FIG. 1, resource inventory 104 stores the state of the different resources 102 in declarative form and exposes a create, read, update, delete (CRUD) application programming interface (API) 124 for access by automated systems 126 and manual or out-of-boundary requestors 128. Resource control system 106 includes automated components that manage the underlying resources 102 and subscriptions 108, 110, 116, and 118 that are hosting resources. Resource control system 106 manages the resources and subscriptions in response to requests made through CRUD API 124. It will be noted that, in one example, a large majority of the API requests made through CRUD API 124 are from automated systems 126.

Figure 2:
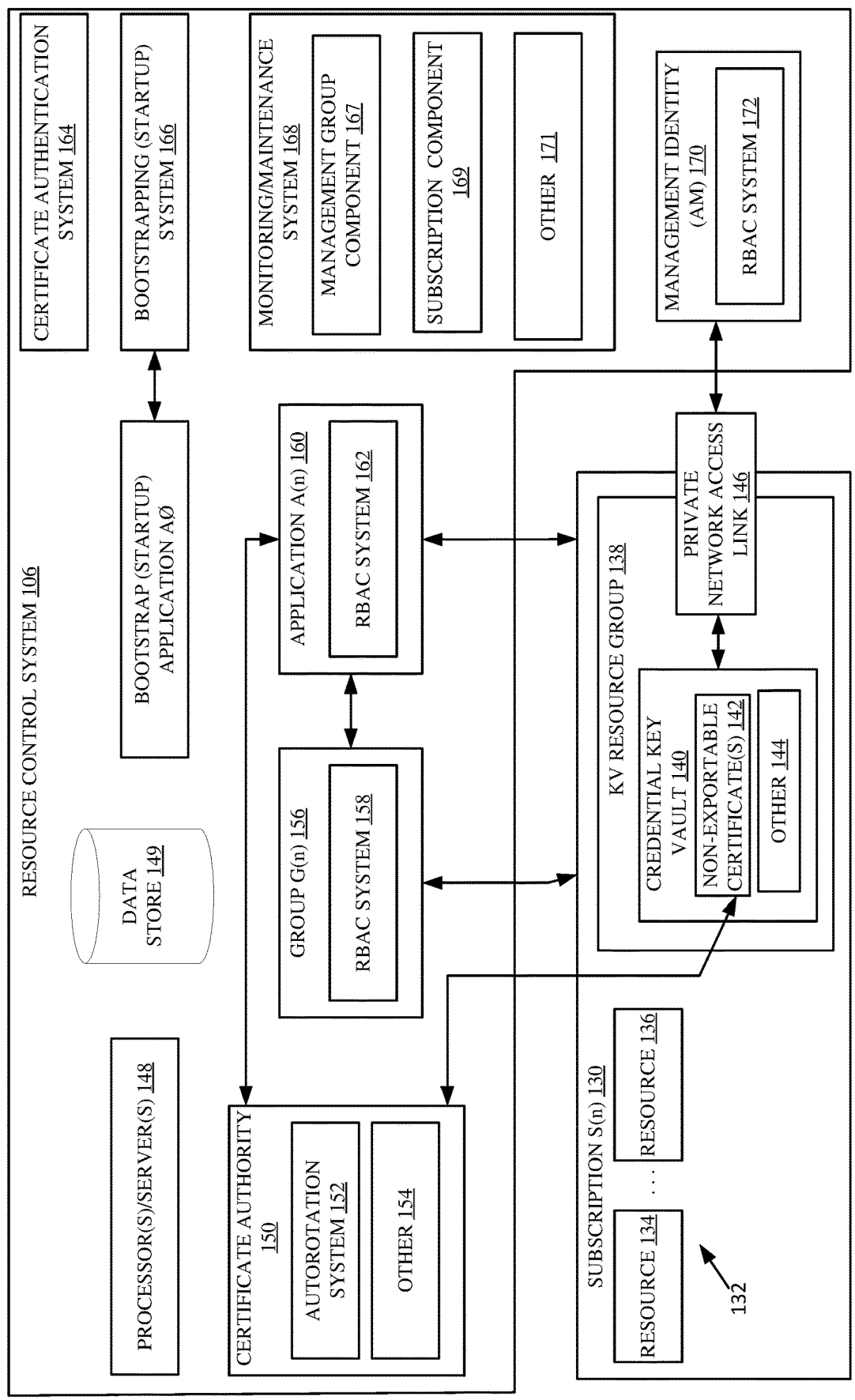
FIG. 2 is a block diagram showing one example of a resource control system in more detail.

FIG. 2 is a block diagram showing an authentication infrastructure deployed in resource control system 106 and a subscription 130 (which may be one of the subscriptions shown in FIG. 1 or a different subscription). FIG. 2 will be referred to in describing how the authentication infrastructure is set up for a single subscription for the sake of example only, and management of subscription groups using management clusters and other management techniques is described in greater detail below.

FIG. 2 shows that, in one example, resource control system 106 is configured to manage a subscription S(n) 130. Subscription S(n) 130 can be configured with a set of resources 132 (which in the example shown in FIG. 2 includes resources 134-136), a key vault resource group 138, and other items 140. Key vault resource group 138 includes a credential key vault 140 that has one or more non-exportable credentials (such as certificates 142) and which can have other items 144. A private network access link 146 is provided to credential key vault 140.

FIG. 2 shows that resource control system 106 can include one or more processors or servers 148, data store 149, a certificate authority 150 (which can include an auto-rotation system 152 and other items 154), a management group G(n) 156 which, itself, can include a role-based access control (RBAC) system 158, a management application A(n) 160 (which, itself, can include an RBAC system 162), a certificate authentication system 164, a bootstrapping (or startup) system 166, a monitoring/maintenance system 168 (which, itself, can include management group component 167, subscription component 169, and other items 171), and one or more external management identities (AM) 170 which, itself, can include an RBAC system 172.

Figure 3A:
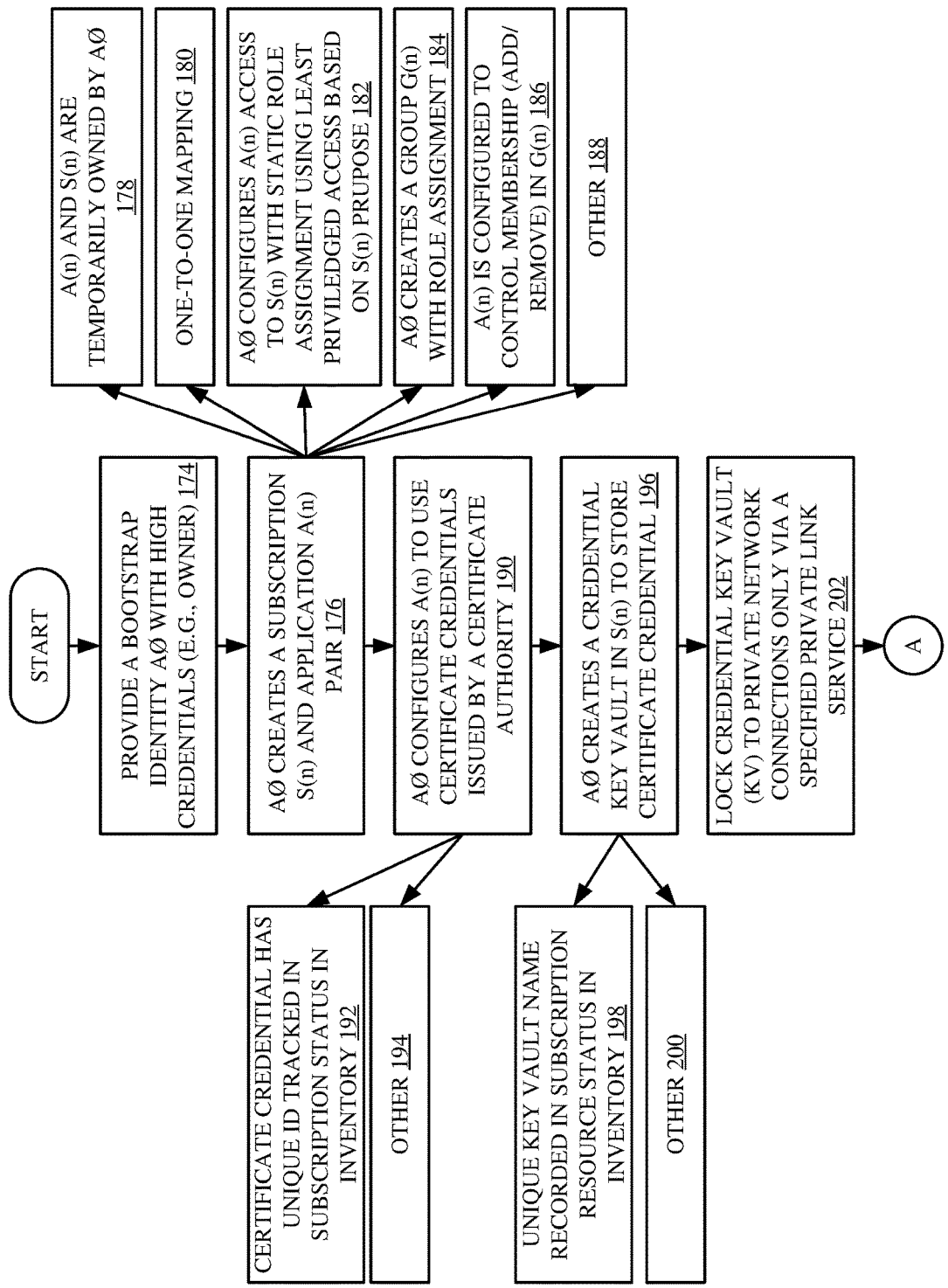
FIGS. 3A and 3B (collectively referred to herein as FIG. 3) show a flow diagram illustrating one example of the operation of the resource control system shown in FIG. 2.
Figure 3B:
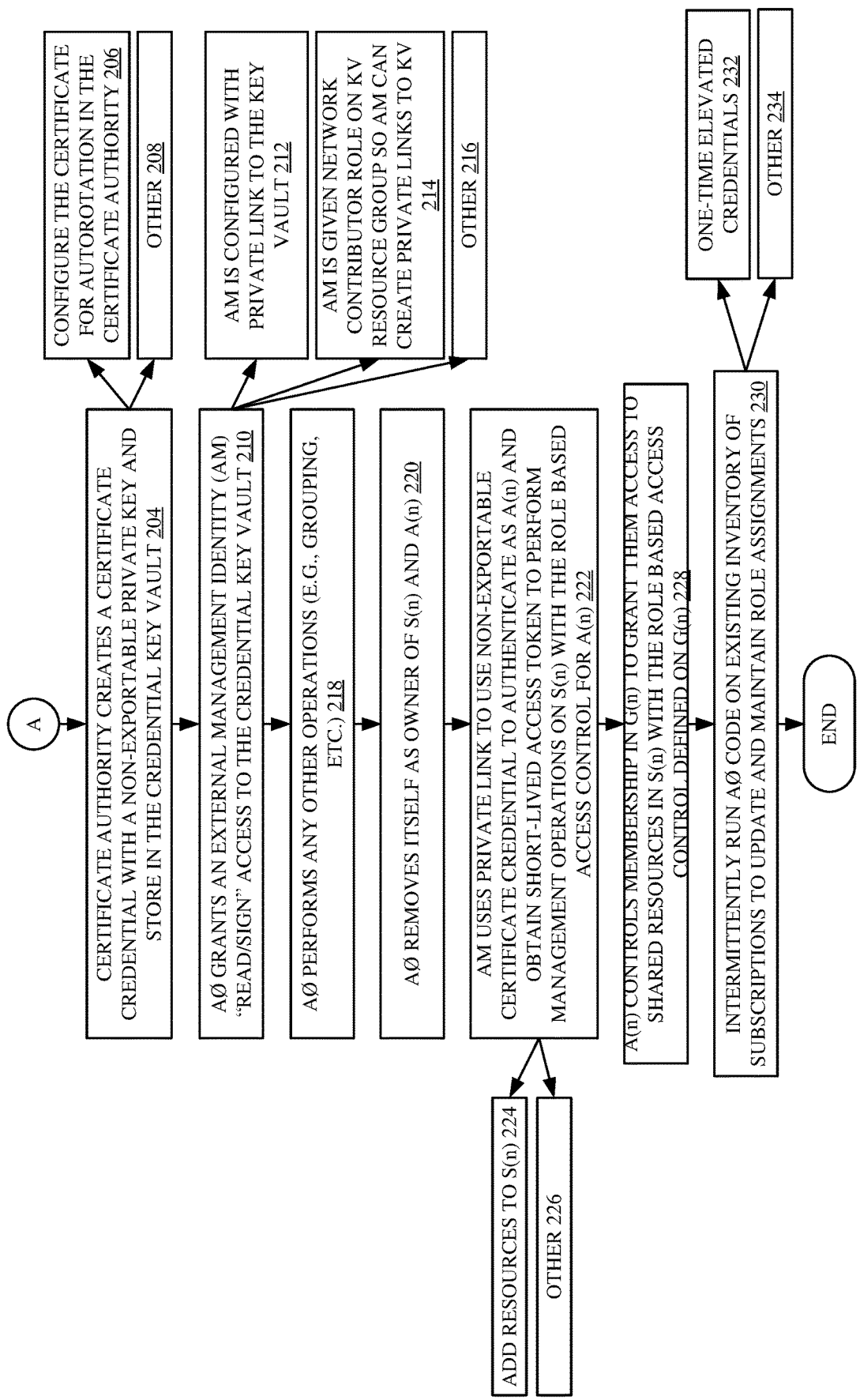

FIGS. 3A and 3B (collectively referred to herein as FIG. 3) show a flow diagram illustrating one example of the operation of resource control system 106 in setting up the authentication infrastructure illustrated in FIG. 2. It is first assumed that bootstrapping (startup) system 166 generates an instance of a bootstrap identity or application A0 and assigns high credentials or high permissions to application A0. By high credentials or high permissions, it is meant, in one example, that application A0 is assigned a role that allows application A0 to manage all resources, applications and groups, including access and role assignments, to those resources, applications, and groups in resource control system 106 and subscription S(n) 130. Providing bootstrap application A0 is indicated by block 174 in the flow diagram of FIG. 3.

Application A0 then creates subscription S(n) 130 and a control application A(n) 160 that is paired with subscription 130 by a one-to-one mapping so that A (n) 160 is only mapped to S(n) 130. In one example, a management or control application A(n) can only perform management or control operations on subscriptions to which it is mapped. Creating the subscription and the application pair is indicated by block 176 in the flow diagram of FIG. 3. In one example, application A0 is given high credentials so that application A(n) 160 and subscription S(n) 130 are temporarily owned by bootstrap application A0, so that bootstrap application A0 can manage application A(n) 160 and subscription S(n) 130, including managing access to those items and role assignments. Having application A(n) 160 and subscription S(n) 130 temporarily owned by bootstrap application A0 is indicated by block 178 in the flow diagram of FIG. 3. The one-to-one mapping between subscription S(n) 130 and application A(n) 160 is indicated by block 180 in the flow diagram of FIG. 3.

Application A0 configures application A(n) 160 with access to subscription S(n) 130 using a static role assignment by assigning a static role to application A(n) 160 so that it can access subscription S(n) 130 using role-based access control system 162. In one example, application A(n) 160 is assigned a role with least privileged access to subscription S(n) based upon the purpose of S(n) 130. Using A0 to configure application A(n) 160 with role-based access to subscription S(n) 130 is indicated by block 182 in the flow diagram of FIG. 3.

Also, in one example, application A0 can generate a control group G(n) 156 with role assignments that can be applied to members of group G(n) 156 so that those members can have role-based access to subscription S(n) 130 through role-based access control system 158. In one example, the group G(n) 156 may be used for subscriptions S(n) that host shared resources to grant access to other system identities to these shared resources. Creating a control group G(n) 156 with role assignments is indicated by block 184 in the flow diagram of FIG. 3.

Also, in one example, application A0 configures application A(n) 160 so that it can control membership in group G(n) 156, as indicated by block 186 in the flow diagram of FIG. 3. Application A(n) 160 can control membership in group G(n) 156 by performing member add/remove operations on G(n) 156. The subscription S(n) 130 and application A(n) 160 can be created by application A0 in other ways as well, as indicated by block 188.

Application A0 then configures application A(n) 160 to use certificate credentials linked to application A(n) by a unique identifier in the certificate Subject Name as indicated by block 190 in the flow diagram of FIG. 3. In one example, the certificate credential generated by certificate authority 150, and used by application A(n) 160, has a unique identifier tracked in the subscription Subject Name and in the subscription status in resource inventory 104 (shown in FIG. 1), as indicated by block 192 in the flow diagram of FIG. 3. Application A0 can configure application A(n) 160 to use certificate credentials in other ways as well, as indicated by block 194.

Application A0 then creates a credential key vault 140 in the subscription S(n) 130 to store the certificate credential issued by certificate authority 150 and used by application A(n) 160. Creating the credential key vault 140 in subscription S(n) 130 is indicated by block 196 in the flow diagram of FIG. 3. Credential key vault 140 is illustratively created by application A0 with a unique key vault name that is recorded in the subscription resource status in resource inventory 104, as indicated by block 198. The credential key vault can be created in other ways as well, as indicated by block 200. Application A0 creates credential key vault 140 so that it is locked to private network connections only via a specified private link service, as indicated by block 202 in the flow diagram of FIG. 3. For example, external management identities 170, which may be in a different virtual network than subscription S(n) 130, may only access credential key vault 140 through a private network access link 146 between the two virtual networks. One way of creating and maintaining private links is discussed below.

Once the credential key vault 140 is created by application A0, then certificate authority 150 can create a certificate credential with a non-exportable private key 142 that is stored in credential key vault 140. Creating the certificate credential and storing a non-exportable private key 142 in credential key vault 140 is indicated by block 204 in the flow diagram of FIG. 3. The certificate credential is also configured for auto-rotation by auto-rotation system 152 in certificate authority 150, as indicated by block 206 in the flow diagram of FIG. 3. The certificate credential can be created and stored in the key vault 140 in other ways as well, as indicated by block 208.

At some point, bootstrap application A0 can grant an external management identity (AM) 170 "read/sign" access to the credential key vault 140 by configuring management identity (AM) 170 with a private link 146 to the key vault 140. Granting external management identity (AM) the read/sign access to credential key vault 140 is indicated by block 210 in the flow diagram of FIG. 3 and configuring management identity (AM) 170 with a private link 146 is indicated by block 212. Also, in one example, bootstrap application A0 gives management identity (AM) 170 a role on the key vault resource group 138 so management identity (AM) 170 can create private links to the key vault 140, as indicated by block 214 in the flow diagram of FIG. 3. Bootstrap application A0 can grant external management identity (AM) 170 access in other ways as well, as indicated by block 216. In this way, the external management identity (AM) 170 is able to use the certificate credential 142 in credential key vault 140 to authenticate with certificate authentication system 164 as application A(n) 160 to obtain a short-lived access token to perform management operations on subscription S(n) 130 with the role-based access control system 172 using the role assigned to application A(n) 160.

Also, with the present structure, the non-exportable certificate credential 142 (with a non-exportable private key) cannot be exfiltrated from key vault 140. Thus, if the management identity (AM) 170 loses access to credential key vault 140 in subscription S(n) 130, then identity (AM) 170 will not be able to issue new access tokens and loses access to manage the resources in subscription S(n) 130 as soon as a current access token expires.

Also, with the configuration described with respect to FIG. 2, application A(n) 160 is able to control group membership of other identities in group G(n) 156 thus controlling access to subscription S(n) 130 using the roles assigned to group G(n) 156 reflected in role-based access control system 158. Using application A(n) 160 to control group membership in group G(n) 156 in this way replaces the need for high privileged roles to be assigned in order to accomplish dynamic access control.

Bootstrap application A0 can then perform any other operations (such as generating subscription groups and configuring access and role assignments to management clusters, etc.) as indicated by block 218 in the flow diagram of FIG. 3. Generating subscription groups and managing access by assigning roles to management clusters is described in greater detail below with respect to FIGS. 4-6.

When configuration of the architecture shown in FIG. 2 is completed, bootstrap application A0 removes its own high credentials or high permissions by removing itself as the owner of subscription S(n) 130 and application A(n) 160. Having bootstrap application A0 remove itself as owner of these items is indicated by block 220 in the flow diagram of FIG. 3. It will be noted that bootstrap application A0 is configured to remove itself as the owner of the items it has created, prior to resources being assigned to subscription S(n) 130. Once A0 removes itself as owner, A0 does not have any access to subscription S(n) thereafter. In this way, even if bootstrap application A0 is compromised, it will not have access to resources, because they are not yet assigned to the resource container subscription S(n) 130.

At this point, application A(n) 160 and members of group G(n) 156 can perform management operations on subscriptions S(n) 130 using different types of authentication. Also, external management identity (AM) 170 can use the certificate credential 142 in credential key vault 140 to authenticate itself as application A(n) 160 to certificate authentication system 164. This allows management identity (AM) 170 to obtain short-lived access tokens to perform management operations on the resources in subscription S(n) 130 with the role-based access configuration of system 162 in application A(n) 160. Having application A(n) 160, members of group G(n) 156, and management identity (AM) 170 operate in this way is indicated by block 222 in the flow diagram of FIG. 3. This technique can be used to add resources 134-136 to subscription S(n) 130 as indicated by block 224. Other management operations can be performed on subscription S(n) as well, as indicated by block 226.

This further enhances security because management identity (AM) 170 must perform multiple operations in order to access subscription S(n) 130. First, management identity (AM) 170 must obtain an access token for credential key vault 140 in subscription S(n) 130. Then, management identity (AM) 170 must use that credential to obtain an access token for subscription S(n) 130 in order to add resources 132 to subscription S(n) 130 or to otherwise access those resources. This reduces the likelihood that any surreptitious activity can be performed through an external management identity.

Also, as configured in FIG. 2, application A(n) 160 can control membership in group G(n) 156 to control access to subscription S(n) 130 with the role-based access configuration in system 158 of group G(n) 156. This is indicated by block 228 in the flow diagram of FIG. 3.

It will also be noted that bootstrapping (startup) system 166 can generate another instance of an application with the functionality of application A0, and intermittently run that instance of the application on the existing inventory of subscriptions in resource inventory 104 in order to update and maintain role assignments, as indicated by block 230. In one example, when an intermittent instance of application A0 is generated, it is given one-time elevated credentials to perform the maintenance and update operations, as indicated by block 232. The one time elevated credentials are time bound and relatively short lived so that no high privilege standing access exists. The code can be intermittently run in other ways as well, as indicated by block 234.

Figure 4:
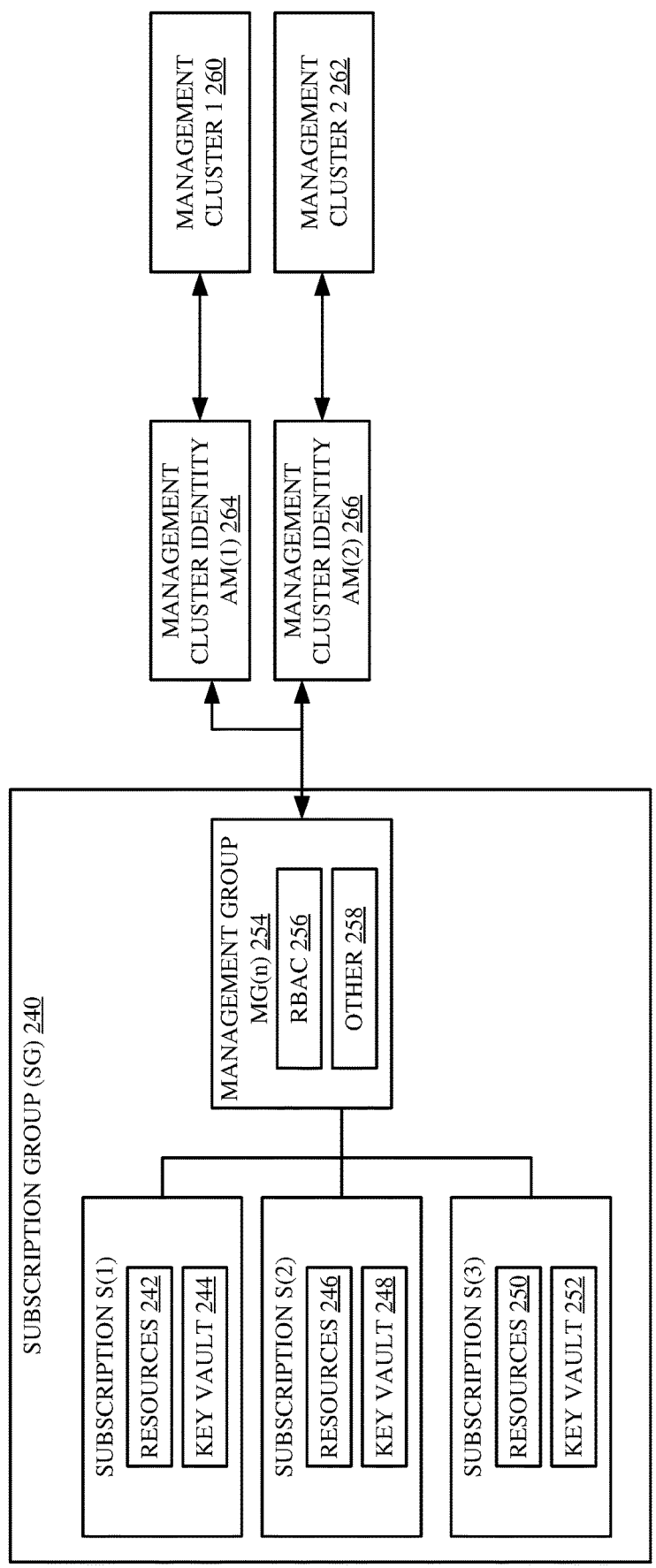
FIG. 4 illustrates one example in which subscriptions are grouped and managed by management clusters.

FIG. 4 illustrates a configuration in which sets of subscriptions can be managed together. In order to enhance the segmentation for management identities (e.g., management applications A(n), members of the groups G(n), external management identities (AM)) in the system, subscriptions are grouped into subscription groups, one of which is shown as subscription group 240 in FIG. 4. Subscription group 240 illustratively includes subscriptions S(1), S(2) and S(3). Subscription S(1) is configured with resources 242 and key vault 244. Subscription S(2) is configured with resources 246 and key vault 248. Subscription S(3) is configured with resources 250 and key vault 252. The subscription group 240 is represented by a management group MG(n) 254 which is assigned roles by application A0 that are used to access subscriptions S(1), S(2), and S(3) using role-based access control configuration 256 and may include other items 258. Group 254 can obtain a role assignment for "read" access to the credential key vault certificates and "sign" access to the credential key vault keys in key vaults 244, 248, and 252. As discussed above, the role assignments are performed by bootstrap application A0 during subscription bootstrapping (or startup). The role assignment also maps any given subscription to a subscription group (thus mapping subscriptions S(1), S(2), and S(3) to subscription group 240).

A set of management clusters 260 and 262 each have a corresponding management plane identity 264 and 266, respectively. The management clusters 260 and 262 are given access to (or assigned to) the subscription group 240 by adding their management plane identities 264 and 266 as members of the management group 254. Thus, the access of management clusters to subscription group 240 is controlled via simple group membership operations in management group MG(n) 254. It will be noted that identities in the system architecture 100 or resource control system 106 do not have standing (or continuous) access to manage membership in management group 254. This enhances more strict access control to all platform resources. Similarly, in order to enhance segmentation in the system, the subscription groups 240 are managed by isolated instances of management clusters 260 and 262.

It will also be noted that the management clusters and subscription groups can be organized in high availability pairs, in one of a number of different ways, as indicated by block 300. Some examples of this are illustrated in FIGS. 5A, 5B, and 5C.

Figure 5A:
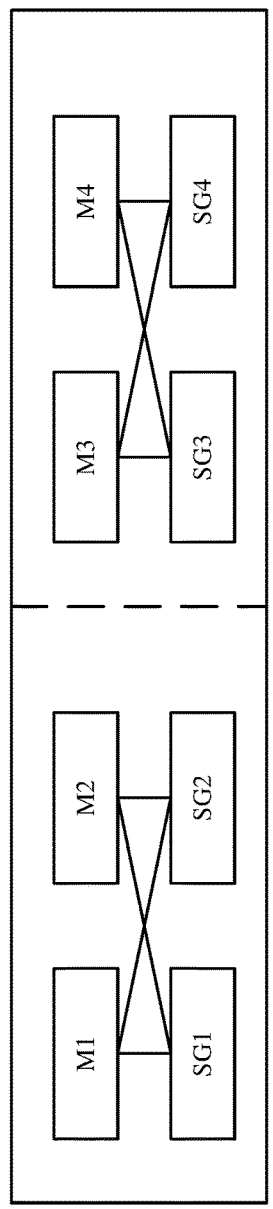
FIGS. 5A, 5B, and 5C show different examples in which management clusters can be paired with subscription groups to achieve a high availability architecture.

FIG. 5A, for instance, shows that management clusters M1 and M2 are both configured to access subscription groups SG1 and SG2. Management clusters M3 and M4 are both configured to access subscription groups SG3 and SG4. Since each management cluster has access to two different subscription groups, capacity segmentation is achieved between a first set of subscription groups SG1 and SG2, and a second set of subscription groups SG3 and SG4.

Figure 5B:
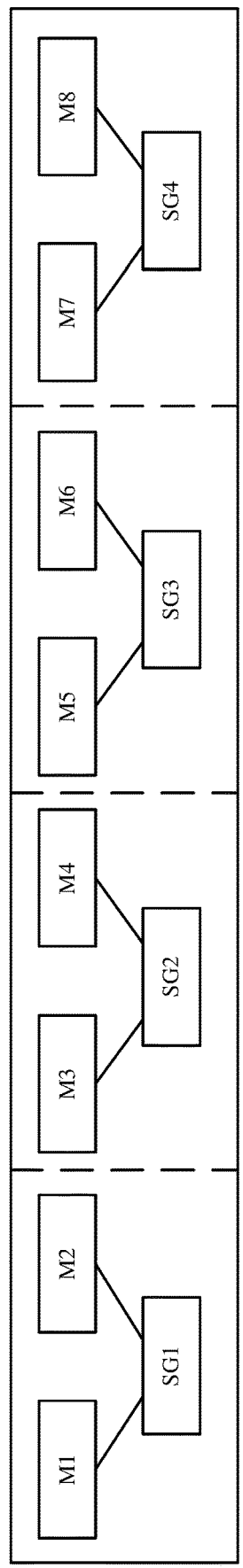

FIG. 5B shows another example of how management clusters and subscription groups can be arranged in a high availability configuration. In the example shown in FIG. 5B, there are multiple management clusters configured for access to a single subscription group. For example, management clusters M1 and M2 are configured to access subscription group SG1. Management clusters M3 and M4 are configured to access subscription group SG2. Management clusters M5 and M6 are configured to access subscription SG3 and management clusters M7 and M8 are configured to access subscription group SG4. Thus, each of the subscription groups are segmented from the other subscription groups, but this requires twice as many management clusters as the arrangement shown in FIG. 5A. Thus, management overhead is relatively high, but subscription segmentation is increased.

Figure 5C:
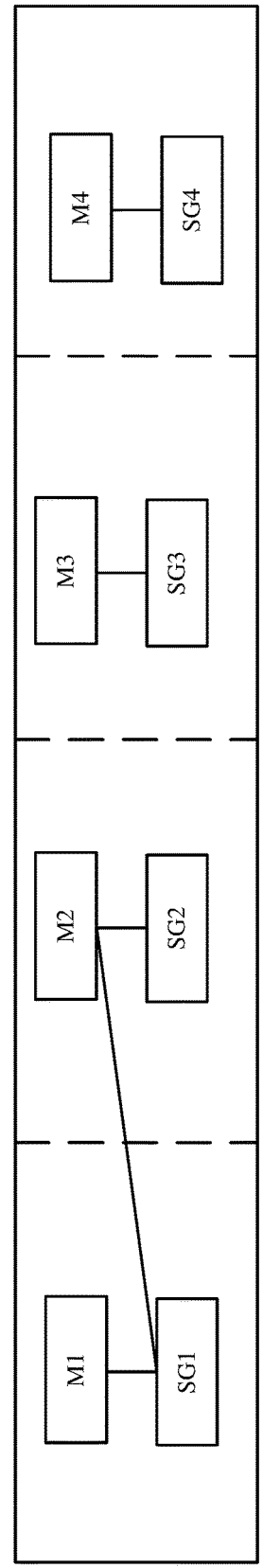

FIG. 5C shows another example in which a single management cluster is configured to access a single subscription group. However, if a management cluster fails, then the corresponding subscription group is temporarily failed over to another management cluster to mitigate the outage and to enable recovery of the failed management cluster. The fail over is then failed back when the failed management cluster is recovered. For instance, FIG. 5C shows that if management cluster M1, which is configured to access subscription group SG1, fails, then subscription group SG1 fails over to management cluster M2, which is ordinarily configured to access subscription group SG2. However, the fail over is temporary so that when management cluster M1 is recovered, subscription group SG1 fails back to management cluster M1. This increases the management operation overhead, but also has relatively high segmentation among the subscription groups.

Figure 6:
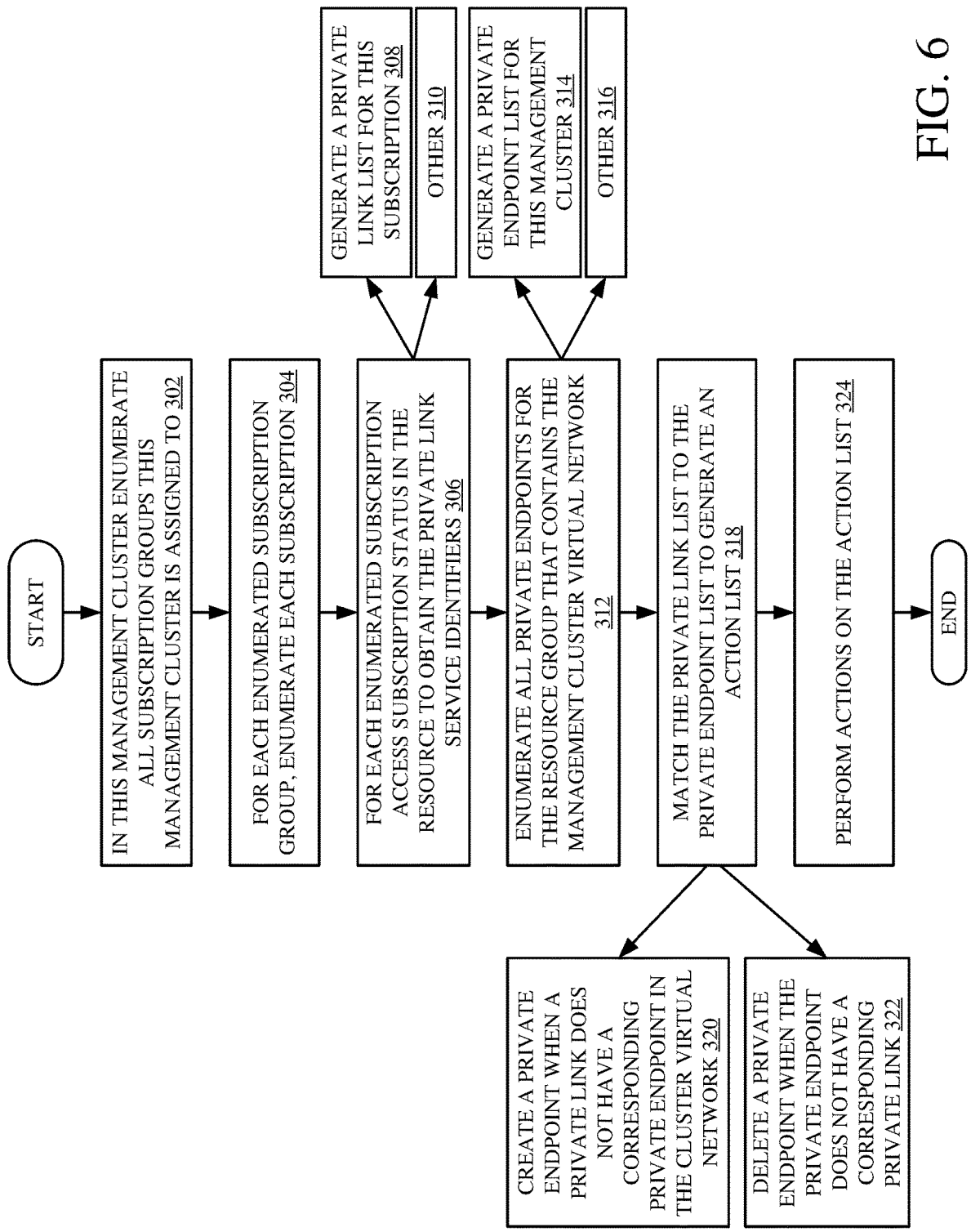
FIG. 6 is a flow diagram illustrating one example of creating a private link from a virtual network to a subscription

FIG. 6 is a flow diagram illustrating one example of generating and using private network access links 146 to provide external management identities (AM) 170 with access to subscription groups. FIG. 6 specifically illustrates one way in which private end points are created in the virtual networks of the management clusters that will be accessing the key vaults in the subscription groups. In the example shown in FIG. 6, it is assumed that a private key vault end point is created when a management cluster is assigned to a subscription group. Each management cluster is illustratively responsible for creating and updating the private end points in its own virtual network. Thus, for a given management cluster, all subscription groups that the given management cluster is assigned to are first enumerated, as indicated by block 302 in the flow diagram of FIG. 6. For each enumerated subscription group, all of the subscriptions in that subscription group are also enumerated, as indicated by block 304. For instance, in the example shown in FIG. 4, all subscription groups 240 to which a particular management cluster 260 is assigned are enumerated. Then, for each of those subscription groups, all of the subscriptions (S(1), S(2), and S(3)) are enumerated. Then, for each enumerated subscription, the subscription status in the resource inventory 104 is accessed to obtain private link service identifiers that identify the private links corresponding to that subscription. Accessing the subscription status information in the resource inventory 104 to obtain the private link service identifiers is indicated by block 306. The private link service identifiers can be used to generate a private link list for this particular subscription, as indicated by block 308. The private link identifiers can be output in other ways as well, as indicated by block 310.

Then, for this particular management cluster, all private end points for the group that contains the virtual network of the management cluster are enumerated as well, as indicated by block 312. The private end points are used to generate a private end point list for this management cluster, as indicated by block 314. The private end points can be output in other ways as well, as indicated by block 316.

The private link list is then matched against or compared against the private end point list to generate an action list, based upon the comparison or matching, as indicated by block 318. For instance, an action can be generated to create a private end point when a private link does not have a corresponding private end point in the management cluster virtual network, as indicated by block 320. Also, a delete action can be generated to delete a private end point when the private end point does not have a corresponding private link, as indicated by block 322. The management cluster can then perform actions that are on the action list (e.g., creating private end points and deleting private end points) as indicated by block 324.

Figure 7:
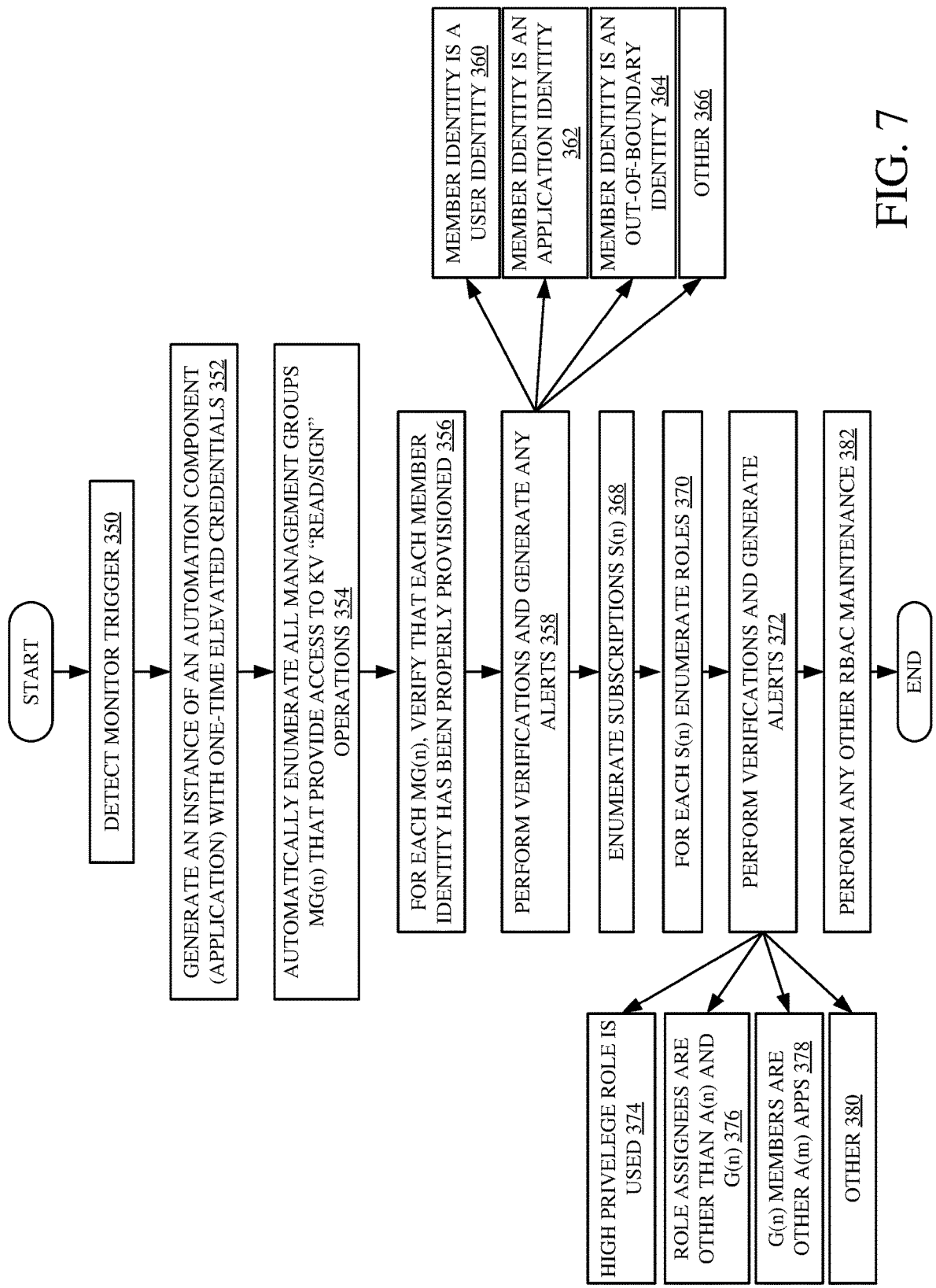
FIG. 7 is a flow diagram illustrating the operation of a monitoring and maintenance system.

FIG. 7 is a flow diagram illustrating how monitoring/maintenance system 168 intermittently performs auditing and/or monitoring and maintenance on the management group identities and the subscriptions. Management group component 167 in system 168 performs monitoring and maintenance with respect to the management groups, while subscription component 169 in system 168 performs monitoring and maintenance of the subscriptions.

Monitoring/maintenance system 168 first detects a monitor trigger as indicated by block 350 in the flow diagram of FIG. 7. For instance, as the platform evolves, the set of roles assigned to the applications and groups may change, and need to be updated during startup or in provisioning new subscriptions, etc. Also, new role-based access control settings may need to be modified on existing subscriptions as well. However, recall that the initial instance of startup application A0 has credentials which are removed and/or which expire and therefore application A0 will not be able to perform such maintenance. Thus, updates and maintenance may need to be performed in another way, and changes to the role-based accessing control system, or to other roles, may be a trigger to perform updates and maintenance. Similarly, the trigger may be a time-based trigger so that the maintenance is performed periodically or otherwise based on time.

In response to the trigger, monitoring system 168 generates an instance of an automation component (or application) with one-time elevated credentials so the instance of the automation component can perform maintenance on management groups, subscriptions, role-based access control settings, etc. Generating an instance of the automation component with one-time time bound, short lived elevated credentials is indicated by block 352 in the flow diagram of FIG. 7. The instance of the automation component can include logic implementing the management group component 167 and logic implementing the subscription group component 169.

Therefore, the management group component 167 first automatically enumerates all management groups that provide access to a key vault with "read/sign" operations. Automatically enumerating the management groups with access to a particular key vault is indicated by block 354 in the flow diagram of FIG. 7. Then, for each enumerated management group, management group component 167 verifies that each member identity in the management group has been properly provisioned, as indicated by block 356. Proper provisioning can be verified in a variety of different ways. Based upon the verification, the management group component 167 can generate any alerts that may be needed, as indicated by block 358. For instance, an alert may be generated where a member identity that identifies a member of the group is a user identity, as indicated by block 360. An alert may be generated where a member identity is an application identity, as indicated by block 362. An alert may be generated where a member identity is an out-of-boundary identity, as indicated by block 364, or an alert may be generated in other ways as well, as indicated by block 366.

Subscription component 169 can then enumerate all subscriptions (S(n)) in a subscription group, as indicated by block 368. For each subscription S(n) subscription component 169 enumerates the roles that have access to the subscription S(n), as indicated by block 370. Subscription component 169 can then generate any needed alerts, as indicated by block 372. For instance, an alert can be generated where any of the enumerated roles is a high privileged role, granting permissions to perform high privilege operations on the subscription S(n), or roles that are identified as high privileged roles in other ways, as indicated by block 374. An alert may be generated where a role assignee is something other than an application A(n) or a group G(n), or where the role assignee is otherwise identified as being a non-allowed role assignee. Generating an alert based upon the identity of role assignees is indicated by block 376 in the flow diagram of FIG. 7. An alert may also be generated where members in a group G(n) are something other than applications A(n), as indicated by block 378 in the flow diagram of FIG. 7. Other verifications can be performed and other alerts can be generated in response to those verifications, as indicated by block 380. The instance of the automation component can then perform any other role-based access control maintenance, by modifying roles, etc., as indicated by block 382.

It can thus be seen that the present description describes a system in which platform resources are partitioned using subscriptions. Some subscriptions hold shared resources. Resource controllers are automated components that manage the underlying resources. For each subscription, a management application is created and mapped to that subscription for performing management operations. This provides a high degree of segmentation. In addition, the credentials used by the managing application are stored in a key vault within the subscription that it manages. Also, in order to create role assignments in the management system, a startup application is generated with highly privileged credentials which expire and/or are removed prior to resources being incorporated into the subscriptions. Further, the subscriptions can be arranged into subscription groups which are managed by management clusters. However, the management clusters do not expose the key vault to the external world. Instead, the key vaults are locked down to communicate only with private links.

Because subscriptions are used as containers for containing resources, and because each subscription has a separate key vault that contains credentials that are used by a management application to access the subscription, the security is enhanced because even if a control application or management application is compromised, it can only access a single subscription (or subscription group) and the application first needs to access the key vault within the subscription and then needs to access the resources in the subscription. Further, if a key vault is compromised, again only the subscription that holds the key vault is compromised. The credentials in the key vault are non-exportable so they are not exposed. Where subscription groups are managed by management clusters, the management clusters are given no knowledge with respect to the number of other subscription groups. The management clusters only have access to the subscription groups to which they have a private link. Therefore, segmentation is achieved by the subscriptions themselves, by the key vaults being stored within the subscriptions, by management clusters only having access to the key vaults through private links, and by the fact that no user identity has superior credentials which provide access to the full system. Instead, during startup, the role-based access control settings are generated, along with the subscriptions and management or control applications and management or control groups, prior to any resources being stored in the subscriptions. Therefore, even the control application with high credentials cannot access any resources or customer data, but can only configure the overall system prior to any resources being assigned to the subscriptions.

It will be noted that the above discussion has described a variety of different systems, components, and/or logic. It will be appreciated that such systems, components, and/or logic can be comprised of hardware items (such as processors and associated memory, or other processing components, some of which are described below) that perform the functions associated with those systems, components, and/or logic. In addition, the systems, components, and/or logic can be comprised of software that is loaded into a memory and is subsequently executed by a processor or server, or other computing component, as described below. The systems, components, and/or logic can also be comprised of different combinations of hardware, software, firmware, etc., some examples of which are described below. These are only some examples of different structures that can be used to form the systems, components, and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays (e.g., alerts) have been discussed. The UI display can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
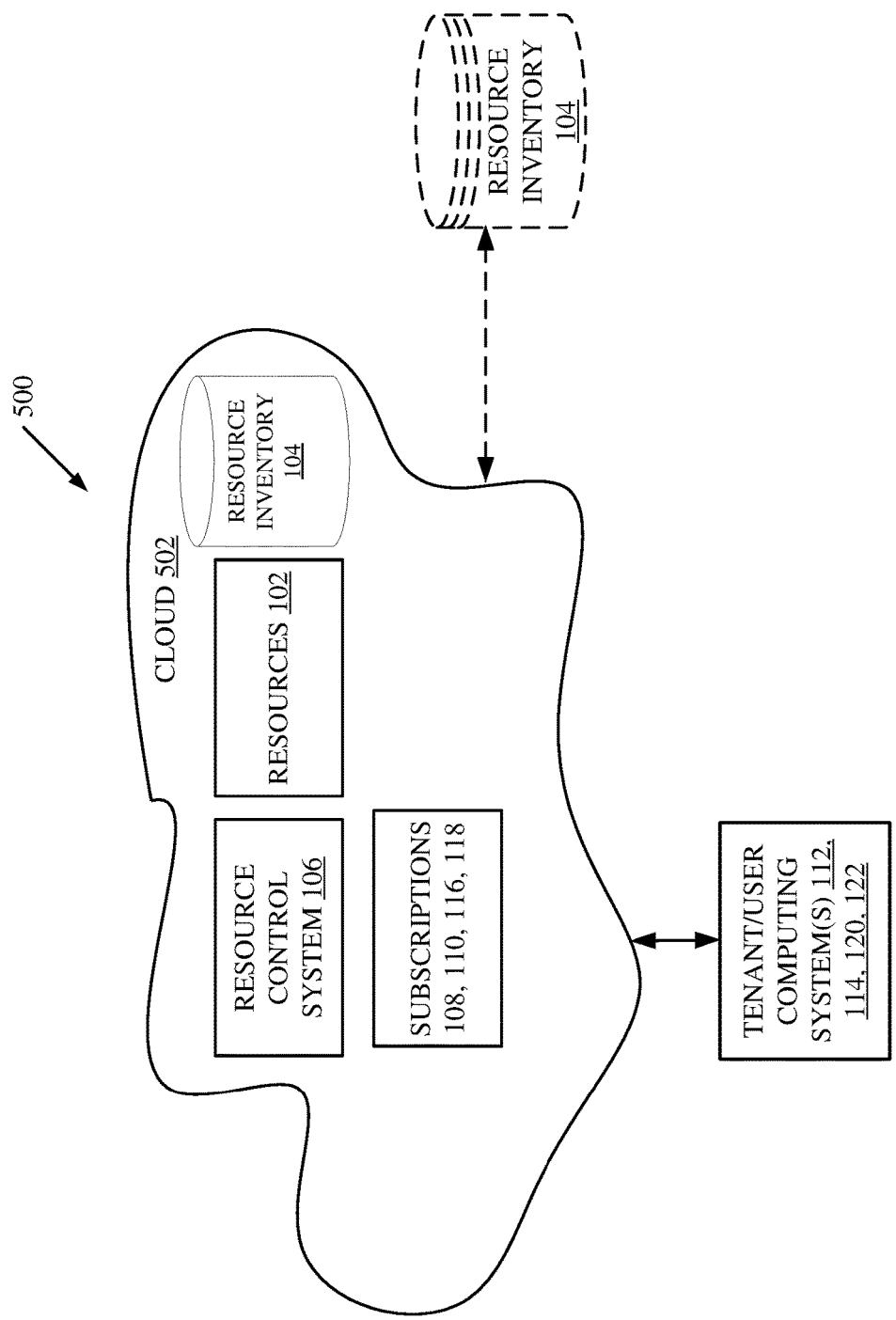
FIG. 8 is a block diagram showing one example of the architectures illustrated in previous figures, deployed in a remote server environment, such as a cloud computing environment.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that resource inventory 104, resources 102, resource control system 106, and subscriptions 108, 110, 116, and 118 can be located in cloud 502 (which can be public, private, or a combination where portions are public while others are private). Therefore, tenant/user computing systems 112, 114, 120, and 122 access those systems through cloud 502.

FIG. 8 also depicts another example of a cloud architecture. FIG. 8 shows that it is also contemplated that some elements of architecture 100 can be disposed in cloud 502 while others are not. By way of example, resource inventory 104 can be disposed outside of cloud 502, and accessed through cloud 502. Regardless of where they are located, the items can be accessed directly by computing systems 112, 114, 120, and 122, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
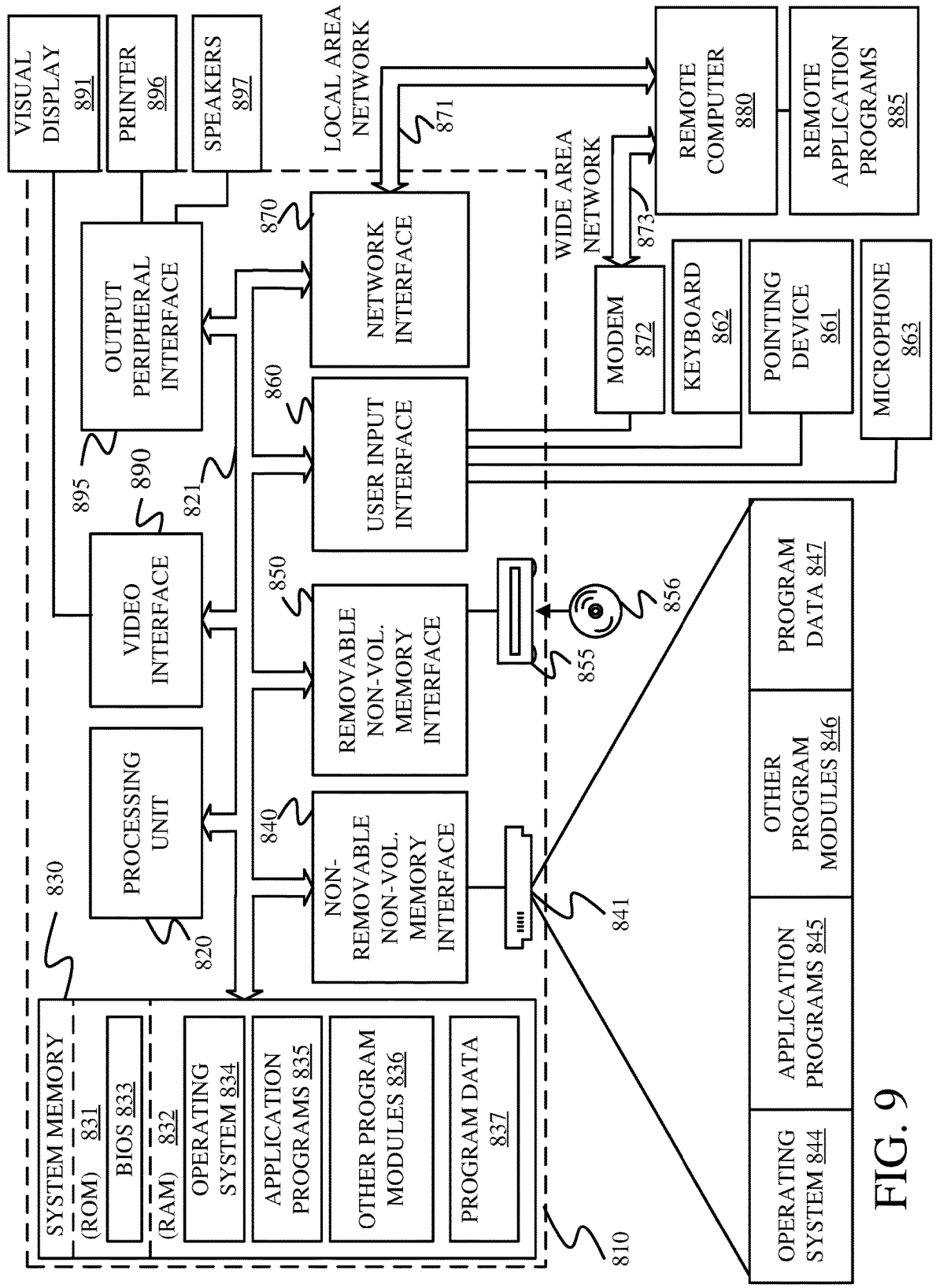
FIG. 9 is a block diagram showing one example of a computing environment that can be used in the architectures and systems shown in previous figures.

FIG. 9 is one example of a computing environment in which architecture 100, or parts of it, (for example) can be deployed. With reference to FIG. 9, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:
   a subscription that includes a resource container to which computing system resources are assigned as subscription resources;
   a management application having an assigned role and configured to access the subscription resources using role-based access; and
   a credential key vault stored within the subscription and storing a certificate credential, the management application using the certificate credential to perform a management operation on the subscription resources.

2. The computer system of claim 1 wherein the credential key vault is configured to store the certificate credential including at least one of a certificate or a private key.

3. The computer system of claim 1 wherein the credential key vault is configured to store the certificate credential as a non-exportable certificate credential that is non-exportable from the credential key vault.

4. The computer system of claim 1 wherein the management application has a one-to-one mapping with the subscription.

5. The computer system of claim 1 and further comprising:
   a management group having an assigned role, wherein member applications, that are members of the management group, are configured to access the subscription resources using role-based access.

6. The computer system of claim 5 wherein the management application has membership control access to the management group to control membership of applications in the management group.

7. The computer system of claim 5 and further comprising:
   a startup system that generates an instance of a startup application with a first set of permissions, the first set of permissions enabling the instance of the startup application to generate the management application, the subscription, and the management group and to make role assignments to the management application and the management group.

8. The computer system of claim 7 wherein the instance of the startup application is configured to remove the first set of permissions, so the instance of the startup application no longer has access to the management application, the subscription, or the management group, prior to the subscription resources being assigned to the subscription.

9. The computer system of claim 8 wherein the subscription is disposed in a first virtual network and further comprising:
   a management identity, disposed in a second virtual network, coupled to obtain read and sign access to the certificate credential in the credential key vault by a private network access link.

10. The computer system of claim 8 wherein the management identity on the second virtual network is configured to authenticate, using the certificate credential, to an authentication system to obtain management access to the subscription resources.

11. The computer system of claim 5 wherein the startup system is configured to intermittently generate an instance of a maintenance application with a single-use set of credentials, the single-use set of credentials enabling the instance of the maintenance application to generate an updated role assignment on the management application and the management group, the single-use set of credentials expiring after the instance of the maintenance application makes the updated role assignment.

12. A computer implemented method, comprising:
   generating an instance of a startup application with a first set of permissions;
   using the first set of permissions to generate a subscription that includes a resource container to which computing system resources are assigned as subscription resources, a management application configured to access the subscription resources using role-based access, and a credential key vault stored within the subscription and storing a certificate credential;
   performing role assignment, with the instance of the startup application, assigning a role to the management application; and
   removing the first set of permissions prior to assigning subscription resources to the subscription.

13. The computer implemented method of claim 12 and further comprising:
   using the certificate credential to perform, with the management application, a management operation on the subscription resources.

14. The computer implemented method of claim 12 and further comprising:
   using the first set of permissions to generate a management group and assign a role to the management group, wherein member applications, that are members of the management group, are configured to access the subscription resources using role-based access.

15. The computer implemented method of claim 14 wherein generating the management application comprises:
   configuring the management application to control membership of applications in the management group.

16. The computer implemented method of claim 12 wherein generating the management application comprises:
   configuring the management application with a one-to-one mapping with the subscription.

17. A computer system, comprising:
   at least one processor; and
   a data store that stores computer executable instructions which, when executed by the at least one processor, cause the processor to implement:
      a subscription group that includes a plurality of subscriptions, each subscription comprising a resource container to which computing system resources are assigned as subscription resources;
      a management group having an assigned role;
      a set of management applications that are members of the management group, each management application, that is a member of the management group, being configured to access the subscription resources using role-based access with the role assigned to the management group;
      a separate management application, separate from the set of management applications, having an assigned role and configured to control membership of management applications in the management group and configured to access the subscription resources using role-based access; and
      a set of credential key vaults, each credential key vault being stored within a different corresponding subscription in the subscription group and storing a certificate credential, the separate management application using the certificate credential to perform a management operation on the subscription resources in the corresponding subscription.

18. The computer system of claim 17 wherein each credential key vault is configured to store a corresponding certificate credential as a non-exportable certificate credential that is non-exportable from the credential key vault.

19. The computer system of claim 17 and further comprising:
   a startup system that generates an instance of a startup application with a first set of permissions, the first set of permissions enabling the instance of the startup application to generate the management application, the subscription group, the separate management application, and the management group and to make role assignments to the separate management application and the management group.

20. The computer system of claim 19 wherein the instance of the startup application is configured to remove the first set of permissions, so the instance of the startup application no longer has access to the separate management application, the subscription group, or the management group, prior to the subscription resources being assigned to the subscription.

* * * * *